No. 686,903. Patented Nov. 19, 1901.
J. NORTHROP.
FILLING REPLENISHING FEELER LOOM AND FILLING CARRIER THEREFOR.
(Application filed June 24, 1901.)
(No Model.) 2 Sheets—Sheet 1.
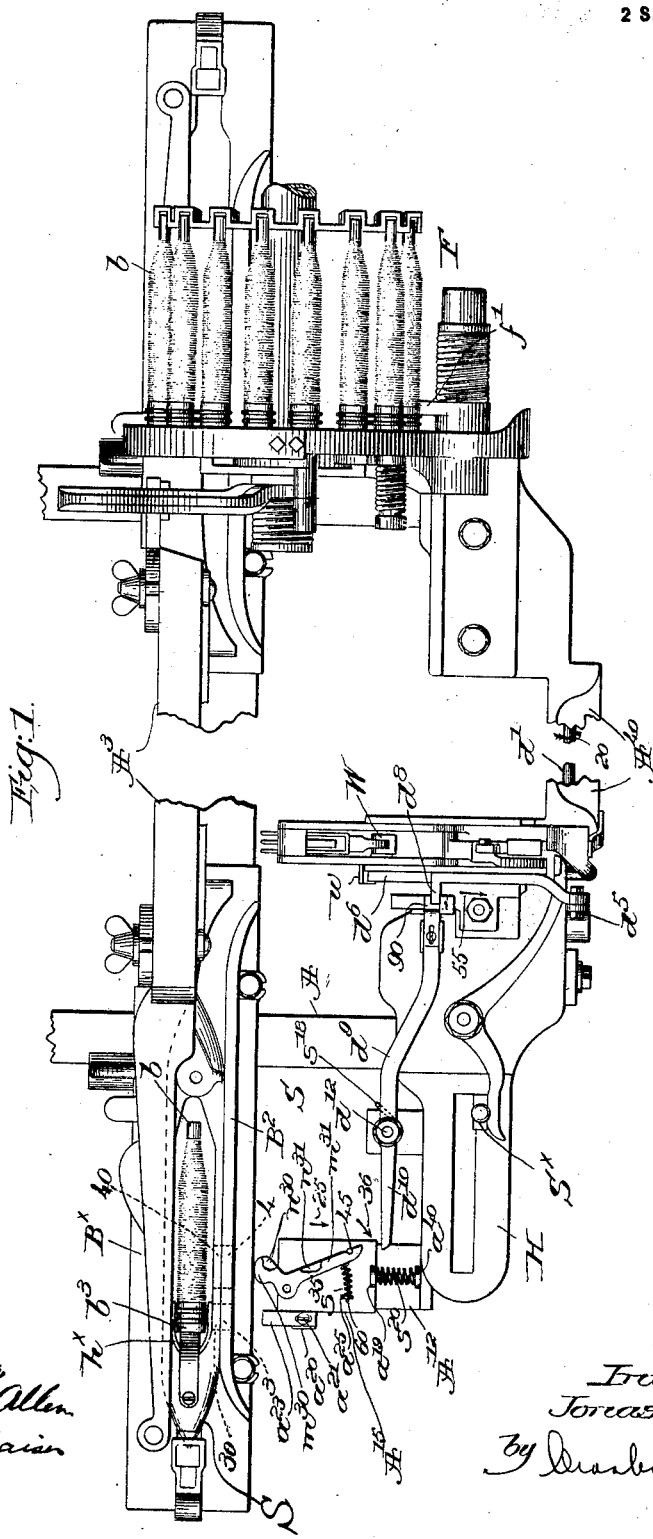
Witnesses,
Edward F. Allen
Adolph F. Kaiser
Inventor,
Jonas Northrop,
By Crosby Gregory
attys.

No. 686,903. Patented Nov. 19, 1901.
J. NORTHROP.
FILLING REPLENISHING FEELER LOOM AND FILLING CARRIER THEREFOR.
(Application filed June 24, 1901.)
(No Model.) 2 Sheets—Sheet 2.
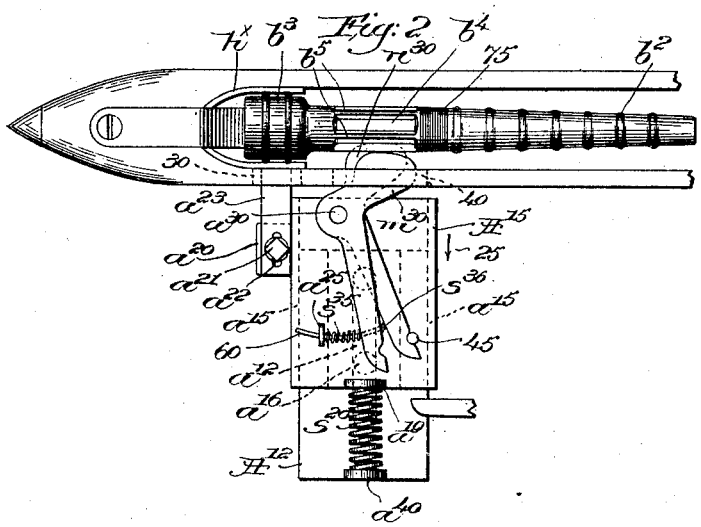
Witnesses,
Edward H. Allen
Adolph B. Kaiser
Inventor,
Jonas Northrop,
by Crosby Gregory
attys.

UNITED STATES PATENT OFFICE.

JONAS NORTHROP, OF HOPEDALE, MASSACHUSETTS, ASSIGNOR TO DRAPER COMPANY, OF PORTLAND, MAINE, AND HOPEDALE, MASSACHUSETTS, A CORPORATION OF MAINE.

FILLING-REPLENISHING FEELER-LOOM AND FILLING-CARRIER THEREFOR.

SPECIFICATION forming part of Letters Patent No. 686,903, dated November 19, 1901.

Application filed June 24, 1901. Serial No. 65,789. (No model.)

*To all whom it may concern:*

Be it known that I, JONAS NORTHROP, a subject of the King of Great Britain, and a resident of Hopedale, county of Worcester, State of Massachusetts, have invented an Improvement in Filling-Replenishing Feeler-Looms and Filling-Carriers Therefor, of which the following description, in connection with the accompanying drawings, is a specification, like letters on the drawings representing like parts.

This invention relates to looms provided with mechanism to automatically replenish the filling when the supply in the shuttle has been exhauted to a predetermined extent—*i. e.*, before complete exhaustion thereof—the particular type of loom being termed, technically, a "feeler-loom," from the fact that the desired point of exhaustion of the filling is detected by or through a feeler.

In my present invention I have embodied various novel features in connection with the feeler mechanism, and I have also provided for effecting the operation of the filling-replenishing mechanism without subjecting the feeler itself to any of the strain attendant upon such operation. I have also shown a plurality of feelers which intermittingly and independently engage the filling, so that should one of the feelers for any reason fail to detect the desired exhaustion of the filling another one will detect it, thus greatly increasing the accuracy of operation of the apparatus.

Heretofore a filling-carrier has been made with a depression therein which is covered by the filling until woven off to the desired extent, the depression at such time being exposed to admit the entrance of the feeler to thereby effect the change of filling, but with such construction the filling-carrier had to be very accurately placed in the shuttle or the feeler would not coöperate with the depression.

Herein I have provided the filling-carrier with a series of axially-arranged depressions extending entirely around the barrel, so that the filling-carrier can be inserted in the shuttle without any care as to the relative position of the depressions. With such filling-carrier the plurality of feelers is most effective, for if one of them should engage a portion of the filling-carrier between two adjacent depressions, and so fail to act properly another feeler will be certain to enter a depression and operate as desired, the depression permitting a considerable detecting movement of the feeler. It will be understood that the series of depressions will be covered by the filling until the latter has been exhausted to the desired extent, and preferably enough filling will still be wound on the filling-carrier at one end of the slots to enable the shuttle to travel one or more times across the lay after detection by the feeler.

Figure 1 is a top or plan view centrally broken out of a feeler-loom having automatic filling-replenishing mechanism and with one embodiment of my invention applied thereto. Fig. 2 is an enlarged detail in plan of a portion of the shuttle, a filling-carrier therein embodying a portion of my present invention, the filling being shown as woven off sufficiently to enable the feeler to detect the same, the feeler device and a portion of the controlling means being also shown. Fig. 3 is a side elevation of the mechanism shown in Fig. 2 looking to the left, the shuttle and filling-carrier being shown in transverse section. Fig. 4 is a view in elevation of the filling-carrier detached. Fig. 5 is a view, partly in section, of a modified form of filling-carrier; and Fig. 6 is a detail to be referred to of a slotted collar to be applied to the filling-carrier shown in Fig. 5.

Referring to Fig. 1, the loom-frame A, breast-beam $A^{40}$, the lay $A^3$, shipper-lever $S^\times$ and its notched holding-plate H, the filling-feeder F to receive the filling-carriers $b$, the transferrer $f'$, and the operating or controlling rock-shaft $d'$ to effect a change of filling when said rock-shaft is rotated in the direction of the arrow 20, Fig. 1, may be and are all as shown in United States Patent No. 646,866, dated April 3, 1900, the filling-replenishing mechanism being located at one side of the loom to transfer a fresh supply of filling when the self-threading shuttle S is in the adjacent shuttle-box, the feeler mechanism in my present invention being located at the opposite or left-hand side of the loom.

The front wall $B^2$ of the shuttle-box $B^\times$ (see Fig. 1) is provided with two apertures 3 4 to correspond or register with two openings or slots 30 40 in the side wall of the shuttle (see dotted lines, Fig. 1) when the shuttle is in the box $B^\times$, the slot 30 being located opposite the holding-jaws $h^\times$, which hold the filling-carrier in operative position in the shuttle, while the slot 40 is located opposite a portion of the barrel of the filling-carrier near the base or head thereof, to be hereinafter referred to.

Referring now to Fig. 3, an $\Gamma$-shaped bracket or stand $A^{10}$ is secured to any suitable part of the loom, it may be to the notched plate H, the horizontal overhanging head $A^{12}$ of the bracket, Figs. 1, 2, and 3, having at its outer end an upturned ear $a^{40}$, and a sliding actuator $A^{15}$ is mounted to slide toward and from the front of the loom upon the horizontal part $A^{12}$ of the stand, said actuator having depending flanges $a^{15}$, which embrace the sides of the part $A^{12}$, the latter having a longitudinal slot $a^{12}$ therein, through which extend depending guide-lugs $a^{16}$, secured to or forming part of the actuator, a retaining plate $a^{17}$, fitted onto the lower ends of said lugs, beneath the part $A^{12}$, being held in place by suitable screws $a^{18}$ and preventing the lifting of the actuator while permitting it to slide back and forth, a spring $s^{20}$ interposed between the lug or ear $a^{40}$ and a similar ear $a^{19}$ on the actuator normally moving the latter rearwardly as far as the slot $a^{12}$ and rearmost lug $a^{16}$ will permit, such position being shown in Figs. 1, 2, and 3. A lateral offset $a^{20}$ on the actuator has adjustably secured thereto by a clamping-bolt $a^{21}$, extended through a slot $a^{22}$ and into the extension, a wear plate or member $a^{23}$, adapted as the lay beats up to enter the slot or opening 3 in the front wall of the shuttle-box $B^\times$. When the shuttle is in said box, as shown in Fig. 1, the wear-plate $a^{23}$ will not only pass through the opening in the front wall of the shuttle-box, but it will also pass through the slot 30 in the shuttle and will be engaged by the holding-jaw $h^\times$, so that as the lay completes its forward movement the actuator will be bodily moved in the direction of the arrow 25 toward the front of the lay.

The actuator forms a part of the means for controlling the time of operation of the filling-replenishing mechanism, and from the foregoing description it will be manifest that the actuator is intermittingly engaged and moved by a part of the shuttle on each alternate forward beat of the lay, and, as will be hereinafter described, such movement of the actuator is made effective at the proper time to cause the filling-replenishing mechanism to be operated.

The holding device or jaws in the shuttle will always be in a very exact relation to the filling-carrier, and being of metal is well adapted to take the blow and effect the movement of the actuator, and for these reasons I have chosen such part of the shuttle to intermittingly coöperate with and move the actuator.

Upon a vertical pivot or fulcrum $a^{30}$, projecting upwardly from the actuator near its rear end, I have mounted a plurality of feelers, which I have shown as thin flat plates $m^{30} n^{30}$, two of such feelers being herein shown, the one superposed above the other and separated by suitable washer, as $w^{10}$, the feelers having rigidly connected therewith arms $m^{31} n^{31}$, extended from the front of the loom and being termed by me "transmitters," for a purpose to be described, the said transmitters being normally held against a suitable pin 45 on the actuator by means of springs $s^{35} s^{36}$, which surround curved pins 60, only one of said pins being clearly shown in Fig. 2, the said pins passing one above another through holes in an upright ear $a^{25}$ on the top of the actuator.

The feelers are adapted to pass through the opening 4 in the front wall of the shuttle-box as the lay beats up, and when the shuttle is in the box $B^\times$ said feelers also enter the shuttle through the slot 40 in the side thereof in my present invention, and so long as the filling in the shuttle has not been exhausted to a predetermined extent the feelers will engage the same and they will be rocked on their pivots to swing the transmitters in the direction of the arrow 36, Fig. 1, as the lay completes its forward beat on each alternate pick. When, however, the filling has been exhausted to a predetermined extent, the feelers will detect such exhaustion and will not be rocked on their fulcrum, so that one or the other, or both, transmitters will then be maintained in position to operate a detent, to be described, to effect the operation of the controlling means for the filling-replenishing mechanism.

Referring to Fig. 1, the rock-shaft $d'$ has an upturned arm $d^5$, on which is pivotally mounted a latch $d^6$, rearwardly extended across the breast-beam and when in operative position being adapted to be engaged by a shoulder $w$ on the usual weft-hammer W. The latch is provided with a transverse projection $d^8$, normally resting upon a wear-plate 90, secured to one end of a detent $d^9$, fulcrumed on a vertical pivot at $d^{12}$ and normally held in the position shown in Fig. 1 by a spring $s^{18}$, the detent having an extension $d^{10}$ beyond its fulcrum in the path of either of the transmitters when the latter are substantially in the position shown in Fig. 1. Now when the filling in the shuttle has been woven off to such an extent that the feelers, either or both, will not be moved on their fulcrum $a^{30}$ sufficiently to swing the transmitters out of the path of the detent extension $d^{10}$, then on the forward movement of the actuator, as has been described, the engagement of a transmitter with such extension will swing the detent on its fulcrum $d^{12}$ to withdraw the plate 90 from beneath the projection $d^3$, and the latch $d^6$ will drop into the path of the shoulder $w$ and be moved in the direction of the arrow 55, Fig. 1, to rock the shaft $d'$ in the direction of the arrow 20, and thereby effect a change of filling. The strain directed from the actuator through the transmitter to the detent will, it will be seen, be transmitted independently of the feeler, as such strain delivered to the transmitter by the fulcrum $a^{30}$ acts through the transmitter solely, and so the feeler is not obliged to resist any of this strain necessary to operate the detent and release the detent. So, too, it will also be manifest that the feelers operate entirely independently one of the other, so that if for any reason one feeler should fail to detect the exhaustion of the filling at the proper time another feeler will detect it and will cause the proper operation of the mechanism.

A plurality of feelers is particularly adapted for use in connection with a filling-carrier of the type herein illustrated, and, referring to Figs. 2, 3, and 4, the barrel $b^2$ of the filling-carrier is shown as provided near the base or head $b^3$ with a series of depressions or pockets $b^4$ axially arranged around the barrel and laterally separated to leave intervening ribs or walls $b^5$, and I prefer to make the depressions, and consequently the ribs, elongated, as herein shown, in order to allow slight differences in the position of the shuttle in the box.

The filling is wound upon the filling-carrier primarily at one or the other end of the series of depressions—as, for instance, at 75, Fig. 2—and then the winding is continued down over the pocketed portion of the barrel, the filling covering or bridging over the depressions as it extends from rib to rib around the barrel until the full amount of yarn has been wound thereupon. Now when the filling-carrier is in the shuttle the filling will be woven off during the operation of the loom, and each time the feeler engages the filling the former will be rocked far enough to move the transmitter into inoperative position until sufficient filling has been woven off to expose the depressions. Then one or the other of the feelers will enter the particular depression opposite thereto as the lay beats up, and the feeler will not be swung on its pivot, so that the transmitter will be in position to coöperate with the detent, as has been described. By having a plurality of feelers the operation is made more certain and accurate, for, referring to Fig. 3, should one of the feelers happen to engage a rib at the proper time for the operation of the filling-replenishing mechanism then the other feeler will enter one of the depressions, detecting the exhaustion of filling to the predetermined extent, and the replenishing mechanism will be duly operated.

It is not broadly new to provide a filling-carrier with a single depression for the reception of a feeler when the filling has been exhausted to a predetermined extent, but with such previous construction it has been necessary to very carefully position the filling-carriers in the feeder, so that when transfer of the shuttle occurs the depression will be opposite the feeler.

With the construction herein shown it will be manifest that no particular care is necessary as to this feature of the invention, because whatever portion of the filling-carrier be turned toward the feeler one of the depressions will be in proper position to coöperate at the right time therewith.

In Fig. 5 I have shown a modification of the filling-carrier shown in Fig. 4 to overcome any possible chance of breaking down the comparatively thin ribs or walls $b^5$ between the depressions or pockets, and in the structure shown in Fig. 5 the barrel of the feeler is reduced in external diameter, as at $b^{40}$, and thereafter a cage-like collar $b^{50}$ is slipped onto the barrel over such reduced portion and secured thereto by compressing or bending in one end of the collar, as at $b^{51}$, Fig. 5, into the material of the barrel. The longitudinal ribs or members $b^{52}$, which form the cage portion of the collar, then take the place of and are equivalent to the ribs $b^5$, (shown in Fig. 4,) and the reduced portion $b^{40}$ is divided into a series of depressions or pockets equivalent to the depressions $b^4$. (Shown in Fig. 4.) The amount of filling remaining on the filling-carrier when the feeler detects will be sufficient to permit the shuttle to lay filling in the shed, at least once after such detection, such amount of filling being contained in the amount wound at one or the other end of the series of depressions. The depressions or pockets are so arranged that there will be at least one for every ninety degrees of circumference of the barrel of the filling-carrier, or, in other words, at least four depressions, and preferably the angle between the longitudinal centers of adjacent depressions will be substantially sixty degrees, the filling-carrier shown in cross-section in Fig. 3 having this arrangement. It will be manifest that the ribs which are interposed between and separate adjacent depressions are made quite thin, and as shown they are of less thickness than the width of the adjacent depressions. The greater the number of depressions within substantially the limits hereinabove referred to the less will be the chance for the feeler to fail to operate at the proper time and the less care will have to be exercised in placing the filling-carriers in the feeder.

My invention is not restricted to the precise construction and arrangement herein shown, as the same may be modified or rearranged in various particulars without departing from the spirit and scope of the invention.

Having described my invention, what I claim as new, and desire to secure by Letters Patent, is—

1. In a loom, a shuttle to contain a supply of filling, filling-replenishing mechanism, means to control the time of its operation, and a plurality of feelers to intermittingly and independently engage the filling in the shuttle, detection by one of the feelers of exhaustion of the filling in the shuttle to a predetermined extent effecting the operation of the controlling means to actuate the filling-replenishing mechanism.

2. In a loom, a shuttle having a slotted side and containing a supply of filling, filling-replenishing mechanism, means to control the time of its operation, and a plurality of feelers to enter the slot of the shuttle to intermittingly and independently coöperate with the filling in the shuttle, to individually determine the operative movement of said controlling means.

3. In a loom, a shuttle to contain a supply of filling, filling-replenishing mechanism, means to control the time of its operation by or through engagement with a part of the shuttle, and a plurality of feelers to independently coöperate with the filling in the shuttle and to prevent operation of said controlling means until detection by one of the feelers of exhaustion of the filling in the shuttle to a predetermined extent.

4. In a loom, a shuttle to contain a supply of filling, filling-replenishing mechanism, means to control the time of its operation, including an intermittingly-moved actuator, and a plurality of feelers mounted to move bodily with the actuator and to intermittingly and independently engage the filling in the shuttle, detection by one of the feelers of exhaustion of the filling in the shuttle to a predetermined extent causing the movement of the actuator to be effective to operate the controlling means and therethrough replenish filling.

5. In a loom, a shuttle to contain a supply of filling, filling-replenishing mechanism, means to control the time of its operation, including a latch, a detent normally maintaining it inoperative, and an actuator moved by the shuttle on alternate picks, and a plurality of feelers bodily movable with the actuator and adapted to intermittingly and independently engage the filling in the shuttle, detection by a feeler of exhaustion of the filling to a predetermined extent operating the detent to release the latch.

6. In a loom, a shuttle to contain a supply of filling, filling-replenishing mechanism, means to control the time of its operation including an actuator to engage and be moved by the shuttle on alternate picks, and a feeler movable with and also relatively to the actuator, to intermittingly engage the filling in the shuttle, detection of exhaustion of the filling to a predetermined extent effecting relative movement of the actuator and feeler and operatively positioning the feeler to effect the operation of the controlling means to actuate the filling-replenishing mechanism.

7. In a loom, filling-replenishing mechanism, and means to control the time of its operation, including a latch, a detent to normally maintain it inoperative, and an actuator positively moved on alternate picks, combined with a feeler pivotally mounted on the actuator and having a connected transmitter, the feeler intermittingly engaging the filling in the shuttle and being moved to render the transmitter inoperative, exhaustion of the filling to a predetermined extent permitting the movement of the actuator to be directed through the transmitter to the detent, to release the latch and effect the actuation of the controlling means.

8. In a loom, filling-replenishing mechanism and means to control the time of its operation, including an actuator positively moved on alternate picks, combined with a feeler pivotally mounted on the actuator and having a connected transmitter, the feeler intermittingly engaging the filling in the shuttle and being moved thereby to render the transmitter inoperative until exhaustion of the filling to a predetermined extent, the movement of the actuator being thereafter directed through the operatively-positioned transmitter to effect the actuation of the controlling means.

9. In a loom, a shuttle to contain a supply of filling, filling-replenishing mechanism located at one side of the loom, an actuator at the opposite side of the loom and positively moved by the shuttle on alternate picks, a plurality of feelers pivotally mounted on the actuator and each having a rigidly-connected transmitter, combined with operating connections between the actuator and the filling-replenishing mechanism, the feelers intermittingly engaging the filling in the shuttle and being moved thereby to render their transmitters inoperative until exhaustion of the filling to a predetermined extent, operative positioning of a transmitter upon detection of such predetermined exhaustion effecting the direct transmission of the movement of the actuator through such transmitter to the operating connections, to cause the actuation of the filling-replenishing mechanism.

10. In a loom, a shuttle having holding-jaws to support a filling-carrier and provided with a side opening opposite said jaws, filling-replenishing mechanism, and means to control the time of its operation, including an actuator adapted to enter the opening and be moved by engagement with the holding-jaw on alternate picks, combined with a feeler adapted to intermittingly engage and be moved by the filling in the shuttle until the filling is exhausted to a predetermined extent, detection of such exhaustion by the feeler causing the movement of the actuator to effect the operation of the controlling means.

11. In a loom, a shuttle to contain a supply of filling, filling-replenishing mechanism, and controlling means to determine the time of its operation, including a sliding actuator moved by engagement with the shuttle on alternate forward beats of the lay, combined with a plurality of feelers pivotally mounted on said actuator, to intermittingly and independently engage the filling in the shuttle, detection by a feeler of predetermined exhaustion of the filling causing the shuttle-induced movement of the actuator to effect the operation of the controlling means.

12. In a loom, a shuttle, a filling-carrier therein having a series of axially-arranged depressions covered by the filling until the latter has been exhausted to a predetermined extent, filling-replenishing mechanism, controlling means therefor, and a plurality of feelers to intermittingly and independently engage the filling covering the depressions of the filling-carrier, entrance of a feeler into one of the depressions causing the said controlling means to effect the actuation of the filling-replenishing mechanism.

13. In a loom, a shuttle to contain a supply of filling, filling-replenishing mechanism, and controlling means to determine the time of its operation, including a latch, a detent to normally maintain it inoperative, and an actuator mounted to slide in a straight path and operatively moved by engagement with a part of the shuttle on alternate forward beats of the lay, combined with a plurality of superposed feelers pivotally mounted on said actuator, and each having a rigidly-connected transmitter, and means to normally position the transmitters in position to engage the detent on the operative movement of the actuator, said feelers intermittingly and independently being engaged and moved by the filling in the shuttle to render the transmitters inoperative until predetermined exhaustion of the filling, the operative movement of the actuator thereafter acting directly through a transmitter to move the detent and release the latch, whereby the effective strain is exerted independently of the corresponding feeler.

14. In a loom, a shuttle to contain a supply of filling, filling-replenishing mechanism, and controlling means to determine the time of its operation, including a latch, a detent to normally maintain it inoperative, and an actuator mounted to slide in a straight path and operatively moved by engagement with a part of the shuttle on alternate forward beats of the lay, combined with a spring-controlled feeler pivotally mounted on the actuator and having a rigidly-connected transmitter to at times engage and move the detent, the feeler intermittingly engaging and being moved by the filling in the shuttle to render the transmitter inoperative until exhaustion of the filling to a predetermined extent, operative movement of the actuator thereafter being directly conveyed through the transmitter to move the detent and release the latch, the strain being exerted independently of the feeler.

15. In a loom, a shuttle having a slotted side and containing a supply of filling, filling-replenishing mechanism, and means to control the time of its operation, including a latch and a detent to normally maintain it inoperative, combined with a pivotally-mounted feeler having a rigidly-connected transmitter, said feeler intermittingly entering the slot of the shuttle to engage the filling and be moved on its pivot until the filling is exhausted to a predetermined extent, and a support for the feeler, movable toward the detent on each alternate forward beat of the lay, such movement acting through the transmitter to engage the detent and release the latch when the filling is exhausted to the predetermined extent.

16. As a new article of manufacture, a filling-carrier for looms, having a barrel provided with a series of axially-arranged depressions or pockets laterally separated at the surface of the barrel by ribs narrower than the width of the depressions.

17. As a new article of manufacture, a filling-carrier for looms, having a barrel provided with a series of axially-arranged elongated depressions or pockets laterally separated at the surface of the barrel, the distance between adjacent depressions being less than the width of the depressions.

18. As a new article of manufacture, a filling-carrier for looms, having a barrel provided with a series of axially-arranged and alternating longitudinal ribs and depressions, the ribs being narrower than the width of the depressions.

19. As a new article of manufacture, a filling-carrier for looms, having a barrel provided with a series of axially-arranged longitudinally-extended and laterally-separated yarn-supporting ribs of less thickness than the width of the spaces between them.

20. As a new article of manufacture, a filling-carrier for looms, comprising a base or head, a barrel, and a series of axially-arranged longitudinal yarn-supporting ribs on the barrel near the head, depressed portions or pockets being presented between the ribs, there being at least one of said depressions for every ninety degrees of circumference of the barrel.

21. As a new article of manufacture, a filling-carrier for looms, comprising a base or head, and a barrel, the latter having a series of axially-arranged depressions or pockets therein extending around its external surface, the portions of the barrel between and separating said depressions presenting a series of yarn-supporting walls or ribs, thinner than the width of the depressions.

22. As a new article of manufacture, a filling-carrier for looms, comprising a base or head, and a barrel, the latter having a series of longitudinally-extended and shallow axial depressions or pockets therein extending around its external surface, the portions of the barrel between and separating said depressions presenting a series of thin yarn-supporting walls or ribs of less thickness than the width of the depressions.

23. As a new article of manufacture, a filling-carrier for looms, having a barrel provided with four or more axially-arranged depressions or pockets laterally separated at the surface of the barrel.

24. As a new article of manufacture, a filling-carrier for looms, having a barrel provided in each ninety degrees of its circumference with one or more axially-arranged and longitudinally-extended depressions or pockets.

25. As a new article of manufacture, a filling-carrier for looms, having a barrel provided with a series of axially-arranged depressions or pockets the longitudinal centers of which are separated from each other by angles of substantially sixty degrees.

In testimony whereof I have signed my name to this specification in the presence of two subscribing witnesses.

JONAS NORTHROP.

Witnesses:
GEORGE OTIS DRAPER,
ERNEST W. WOOD.